(12) United States Patent
Maeda

(10) Patent No.: US 10,863,005 B2
(45) Date of Patent: Dec. 8, 2020

(54) DATA TRANSMITTING PROGRAM, DATA TRANSMITTING DEVICE, AND DATA TRANSMITTING METHOD

(71) Applicant: FUJITSU LIMITED, Kawasaki (JP)

(72) Inventor: Takuma Maeda, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/214,529

(22) Filed: Dec. 10, 2018

(65) Prior Publication Data

US 2019/0199832 A1 Jun. 27, 2019

(30) Foreign Application Priority Data

Dec. 27, 2017 (JP) ................................. 2017-251512

(51) Int. Cl.
| | | |
|---|---|---|
| H04L 29/06 | (2006.01) | |
| H04L 12/863 | (2013.01) | |
| G06F 11/14 | (2006.01) | |
| H04L 29/08 | (2006.01) | |

(52) U.S. Cl.
CPC .......... *H04L 69/04* (2013.01); *G06F 11/1464* (2013.01); *H04L 47/625* (2013.01); *H04L 67/06* (2013.01); *H04L 67/1097* (2013.01)

(58) Field of Classification Search
CPC .... G06F 11/1464; H04L 47/625; H04L 67/06; H04L 67/1097; H04L 69/04
See application file for complete search history.

(56) References Cited

U.S. PATENT DOCUMENTS

| | | | | |
|---|---|---|---|---|
| 5,454,079 A | * | 9/1995 | Roper ..................... | H04L 29/06 709/227 |
| 8,533,166 B1 | * | 9/2013 | Sulieman ................ | H04L 69/04 707/693 |
| 2004/0098452 A1 | * | 5/2004 | Brown .................... | H04L 67/02 709/203 |
| 2004/0103215 A1 | * | 5/2004 | Ernst ...................... | H03M 7/30 709/247 |
| 2012/0246224 A1 | * | 9/2012 | Kawazoe ............... | H04N 19/17 709/203 |

FOREIGN PATENT DOCUMENTS

| | | |
|---|---|---|
| CN | 101599986 | 12/2009 |
| JP | 02-043652 | 2/1990 |
| JP | 2001-523902 | 11/2001 |
| JP | 2015-176337 | 10/2015 |
| TW | 200947215 | 11/2009 |
| WO | 99/26130 | 5/1999 |

OTHER PUBLICATIONS

EESR—The Extended European Search Report of European Patent Application No. 18210405.9 dated May 22, 2019.

* cited by examiner

*Primary Examiner* — Thomas J Dailey
(74) *Attorney, Agent, or Firm* — Fujitsu Patent Center

(57) ABSTRACT

A data transmission method for transmitting compressed data is disclosed. The method includes: classifying transmission target files into transmission groups; calculating, for each of the transmission files, a first compression time taken to compress the file by a first compression system and a first transmission time taken to transmit the file after being compressed by the first compression system; and determining, for each of the transmission groups, transmission order of files belonging to the transmission group based on the first compression time and the first transmission time.

12 Claims, 15 Drawing Sheets

FIG. 8

FIRST COMPRESSION SYSTEM

| DATA | COMPRESSION TIME (SECONDS) | TRANSMISSION TIME (SECONDS) |
|---|---|---|
| DATA D1 | 30 | 30 |
| DATA D2 | 60 | 10 |
| DATA D3 | 40 | 20 |

FIG. 9

FIRST COMPRESSION SYSTEM

| PATTERN NUMBER | TRANSMISSION ORDER | TRANSMISSION COMPLETION TIME (SECONDS) |
|---|---|---|
| 1 | DATA D1<br>DATA D2<br>DATA D3 | (30+60+40+20)<br>150 |
| 2 | DATA D1<br>DATA D3<br>DATA D2 | (30+40+60+10)<br>140 |
| 3 | DATA D2<br>DATA D1<br>DATA D3 | (60+30+40+20)<br>150 |
| 4 | DATA D2<br>DATA D3<br>DATA D1 | (60+40+30+30)<br>160 |
| 5 | DATA D3<br>DATA D1<br>DATA D2 | (40+30+60+10)<br>140 |
| 6 | DATA D3<br>DATA D2<br>DATA D1 | (40+60+30+30)<br>160 |

FIG. 12

SECOND COMPRESSION SYSTEM

| DATA | COMPRESSION TIME (SECONDS) | TRANSMISSION TIME (SECONDS) |
|---|---|---|
| DATA D1 | 15 | 60 |
| DATA D2 | 30 | 20 |
| DATA D3 | 20 | 40 |

FIG. 13

SECOND COMPRESSION SYSTEM

| PATTERN NUMBER | TRANSMISSION ORDER | TRANSMISSION COMPLETION TIME (SECONDS) |
|---|---|---|
| 1 | DATA D1<br>DATA D2<br>DATA D3 | (15+60+20+40)<br>135 |
| 2 | DATA D1<br>DATA D3<br>DATA D2 | (15+60+40+20)<br>135 |
| 3 | DATA D2<br>DATA D1<br>DATA D3 | (30+20+60+40)<br>150 |
| 4 | DATA D2<br>DATA D3<br>DATA D1 | (30+20+40+60)<br>150 |
| 5 | DATA D3<br>DATA D1<br>DATA D2 | (20+40+60+20)<br>140 |
| 6 | DATA D3<br>DATA D2<br>DATA D1 | (20+40+20+60)<br>140 |

DATA TRANSMITTING PROGRAM, DATA TRANSMITTING DEVICE, AND DATA TRANSMITTING METHOD

CROSS-REFERENCE TO RELATED APPLICATION

This application is based upon and claims the benefit of priority of the prior Japanese Patent Application No. 2017-251512, filed on Dec. 27, 2017, the entire contents of which are incorporated herein by reference.

FIELD

The embodiments discussed herein are related to a data transmitting program, a data transmitting device, and a data transmitting method.

BACKGROUND

In cloud communication, for example, a database for backup is prepared, and data for backup is updated periodically or irregularly. In this case, a communicating device in the cloud communication may, for example, transmit compressed data to the database for backup, the database being coupled to the communicating device via a network.

In a case where the communicating device transmits the compressed data, the communicating device performs data compression processing and data transmission processing in parallel with each other. In a case where the communicating device transmits a plurality of pieces of data, the communicating device compresses data to be transmitted next while transmitting compressed data. Technologies related to the compression and transmission of data are described in Japanese National Publication of International Patent Application No. 2001-523902 and Japanese Laid-open Patent Publication No. 02-043652.

However, when compressed data is transmitted, unless compression of next data is completed during the transmission of the data, a time during which no data is transmitted occurs, so that it is difficult to use a communication line effectively. On the other hand, when the compression of the next data is completed during the transmission of the data, a data transmission completion waiting time occurs, so that it is difficult to utilize the processing power of the communicating device effectively. In either case, a wait for completion of data compression or a wait for completion of data transmission occurs, and a time taken to complete the transmission of the data is delayed.

Accordingly, in one aspect, it is an object of the present technology to provide a data transmitting program, a communicating device, and a data communicating method that transmit compressed data efficiently.

SUMMARY

According to an aspect of the embodiments, a data transmission method for transmitting compressed data is disclosed. The method includes: classifying transmission target files into transmission groups; calculating, for each of the transmission files, a first compression time taken to compress the file by a first compression system and a first transmission time taken to transmit the file after being compressed by the first compression system; and determining, for each of the transmission groups, transmission order of files belonging to the transmission group based on the first compression time and the first transmission time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of compression times and transmission times of data D1 to D3 in a first compression system;

FIG. 9 is a diagram illustrating an example of transmission completion times of respective transmission orders in the first compression system;

FIG. 12 is a diagram illustrating an example of compression times and transmission times of data D1 to D3 in a second compression system;

FIG. 13 is a diagram illustrating an example of transmission completion times of respective transmission orders in a second compression system;

DESCRIPTION OF EMBODIMENTS

<Example of Configuration of Communication System>

Figure 1:
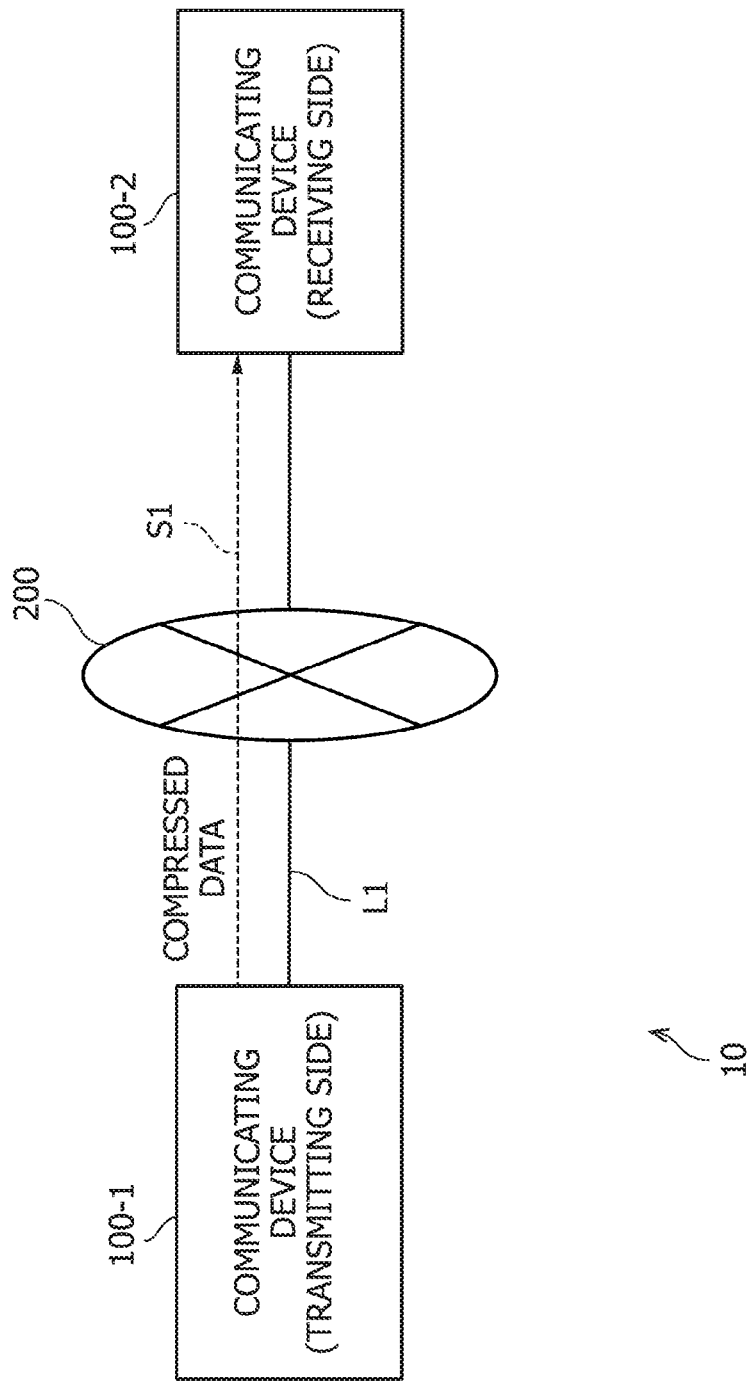
FIG. 1 is a diagram illustrating an example of a configuration of a communication system.

FIG. 1 is a diagram illustrating an example of a configuration of a communication system. A communication system 10 depicted in FIG. 1 includes communicating devices 100-1 and 100-2 (which may hereinafter be referred to as communicating devices 100) and a network 200. The communication system 10, is for example, a system in which the communicating device 100-1 transmits data or a file to the communicating device 100-2, and stores the data or the file in a database for backup, the database being possessed by the communicating device 100-2. The data for backup is, for example, periodically updated in the communication system 10.

The communicating device 100-1 is a data transmitting device that transmits a file to the communicating device 100-2. The communicating device 100-1 is, for example, a computer. The communicating device 100-1 is, for example, coupled to the communicating device 100-2 via the network 200. The communicating device 100-1 is coupled to the network 200 or the communicating device 100-2 via a communication line L1. The communication line L1 is a wire such as an optical cable or the like. The communication line L1 may also be a radio line. The communicating device 100-1, for example, periodically transmits a file (data) to be backed up to the communicating device 100-2. In the transmission to the communicating device 100-2, the communicating device 100-1 transmits a compressed file obtained by compressing the file to be transmitted (S1).

In a case where the communicating device 100-1 transmits a plurality of files, the communicating device 100-1 assigns each of the plurality of files to a group including one or more files (which group will be referred to as a transmission group). Then, the communicating device 100-1 determines, for each transmission group, the compression system and transmission order of files belonging to the transmission group. The communicating device 100-1, for example, determines the compression system and transmission order of the files based on compression times and transmission times (times from a start of transmission to completion of the transmission) of the files.

The communicating device 100-2 is a device that receives a file from the communicating device 100-1. The communicating device 100-2 is, for example, a server machine. When the communicating device 100-2 receives a file from the communicating device 100-1, the communicating device 100-2 decompresses the compressed file, and stores the file in the database for backup.

The network 200 is, for example, an intranet. The network 200 may also be a public line such as the Internet or the like.

Incidentally, the communication system 10 may include one or a plurality of communicating devices in addition to the communicating devices 100-1 and 100-2. In addition, in the communication system 10, the communicating device 100-2 may be a transmitting side, and the communicating device 100-1 may be a receiving side.

First Embodiment

A first embodiment will first be described. The communicating device 100-1 classifies each of transmission target files to a transmission group including one or more files. Then, the communicating device 100-1 calculates, for files belonging to each transmission group, a first compression time taken for compression by a first compression system and a first transmission time taken to transmit the file after the compression by the first compression system. The communicating device 100-1 determines, for each transmission group, transmission order of the files belonging to the transmission group based on the calculated first compression time and the calculated first transmission time.

Incidentally, the first compression system is a compression system given a highest priority or a specified compression system.

<Example of Configuration of Communicating Device>

Figure 2:
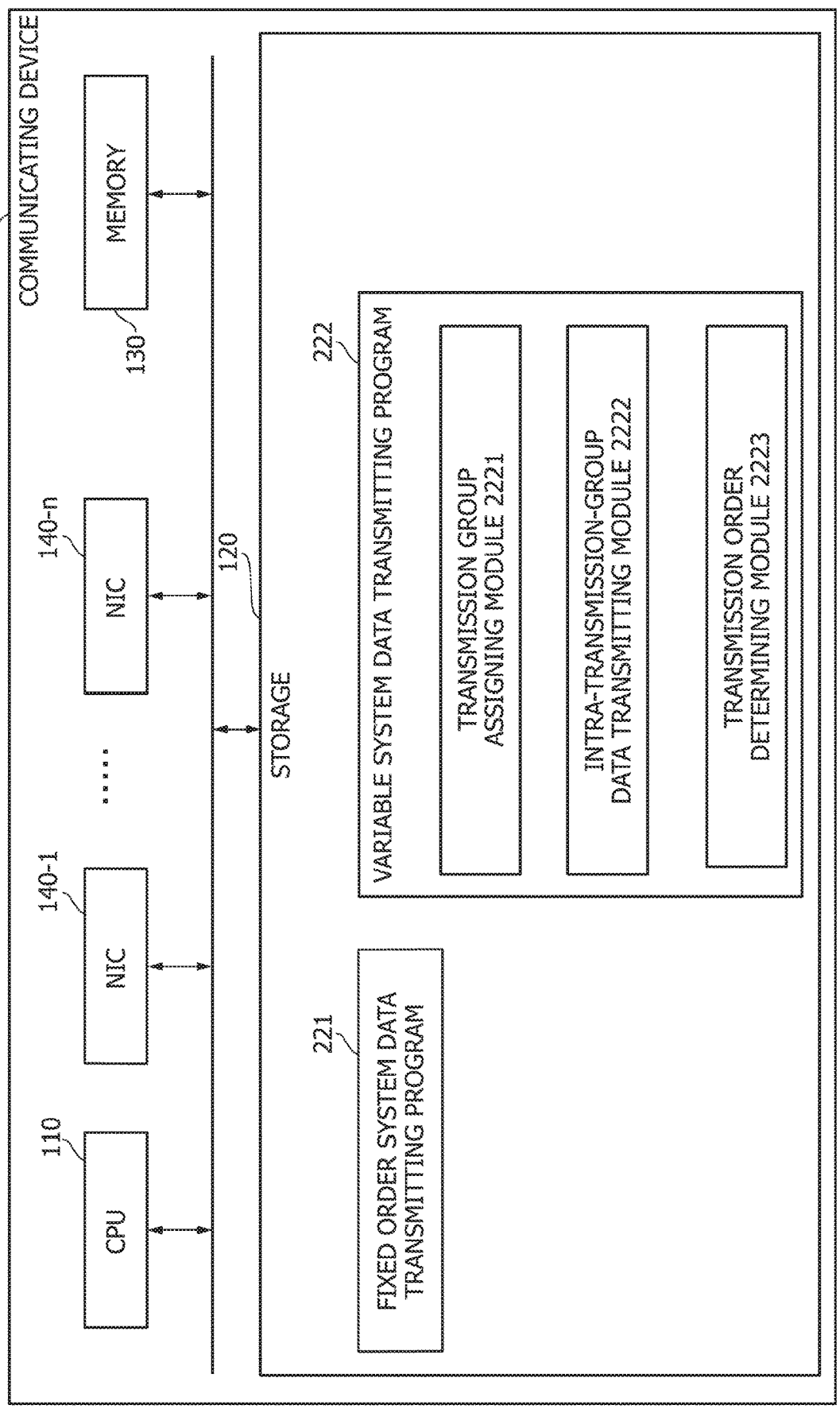
FIG. 2 is a diagram illustrating an example of a configuration of a communicating device.

FIG. 2 is a diagram illustrating an example of a configuration of a communicating device. A communicating device 100 depicted in FIG. 2 includes a central processing unit (CPU) 110, a storage 120, a memory 130, and network interface cards (NICs) 140-1 to n (which may hereinafter be referred to as NICs 140). The communicating device 100 is a device that transmits and receives data to and from another communicating device.

The storage 120 is an auxiliary storage device such as a flash memory, a hard disk drive (HDD), a solid state drive (SSD), or the like, which stores a program and data. The storage 120 includes a fixed order system data transmitting program 221 and a variable system data transmitting program 222.

The memory 130 is an area into which the program stored in the storage 120 is loaded. The memory 130 is also used as an area in which the program stores data.

The NICs 140 are devices that are coupled to and communicate with another communicating device or a network. The NICs 140 are, for example, network interface cards. The NICs 140 may also be coupled to another communicating device or a network via, for example, a hub or the like.

The CPU 110 is a processor or a computer that loads the program stored in the storage 120 into the memory 130, executes the loaded program, and thereby implements pieces of processing.

The CPU 110 performs data transmission processing by a fixed order system by executing the fixed order system data transmitting program 221. The data transmission processing by the fixed order system is processing that uses a given compression system and transmits data by a transmission system that compresses and transmits the data in fixed transmission order (for example, data generation order or data number order). Details of the data transmission processing by the fixed order system will be described later.

The CPU 110 constructs a determining unit, a calculating unit, and a classifying unit, and performs data transmission processing by a variable system, by executing the variable system data transmitting program 222. The data transmission processing by the variable system is a system of determining the compression system and transmission order of data based on compression times taken to complete the compression of data (files) and transmission times taken to complete the transmission of the data. Details of the data transmission processing by the variable system will be described later.

In addition, the CPU 110 constructs a classifying unit and performs transmission group assignment processing by executing a transmission group assigning module 2221. The transmission group assignment processing is processing of assigning (classifying) data as transmission targets to (into) transmission groups including a plurality of pieces of data.

In addition, the CPU 110 constructs a calculating unit and a determining unit and performs intra-transmission-group data transmission processing by executing an intra-transmission-group data transmitting module 2222. The processing of the intra-transmission-group data transmitting module is processing that is performed for each transmission group, determines one of or both the transmission order and compression system of data within the transmission group, and transmits the data in the determined transmission order and the determined compression system.

In addition, the CPU 110 constructs a determining unit and performs transmission order determination processing by executing a transmission order determining module 2223. The transmission order determination processing is processing of determining the transmission order of data within a transmission group in the intra-transmission-group data transmission processing.

<Data Transmission by Fixed Order System>

Figure 3:
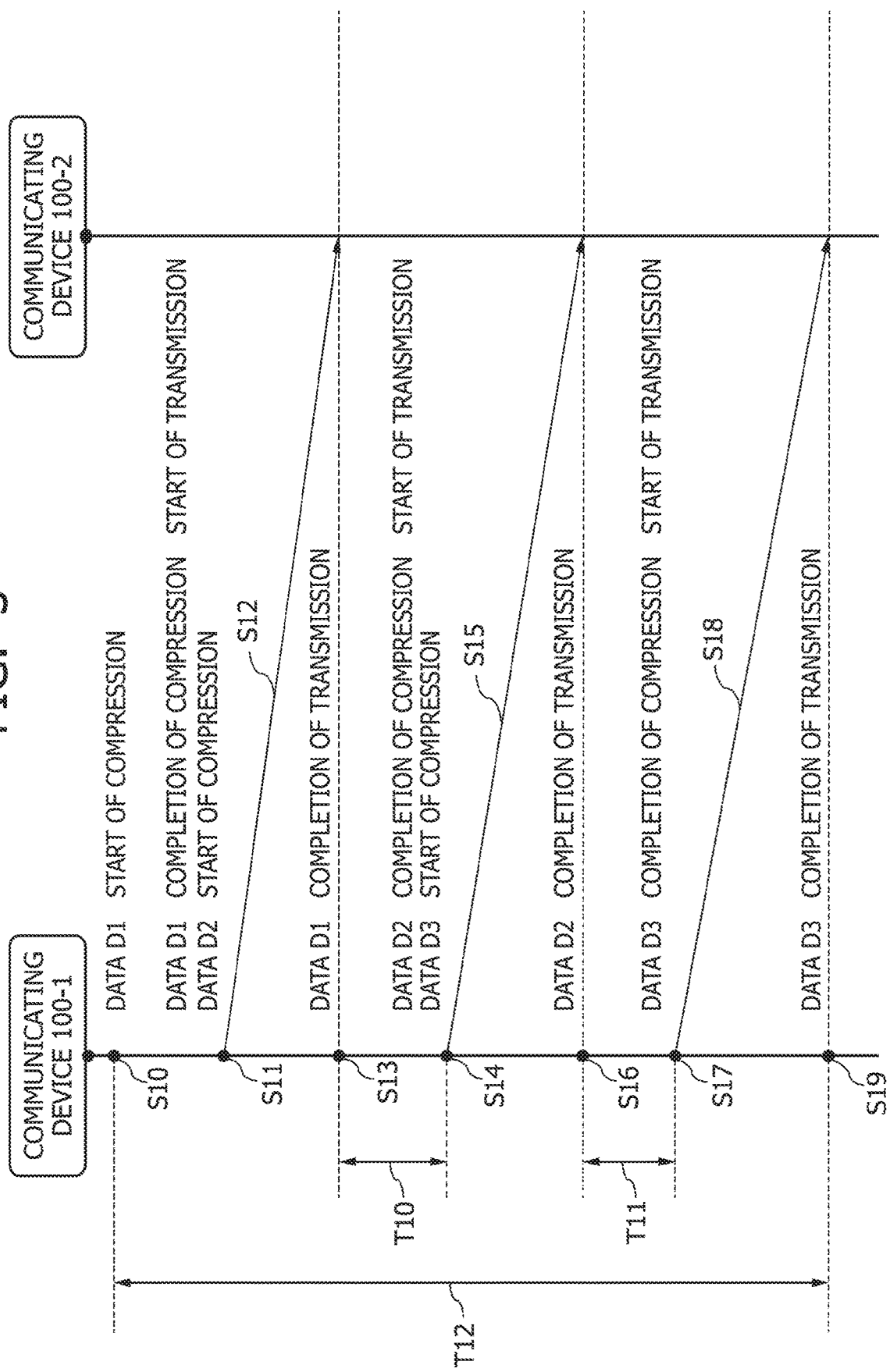
FIG. 3 is a diagram illustrating an example of a sequence of data transmission by a fixed order system.

Data transmission by the fixed order system will be described. FIG. 3 is a diagram illustrating an example of a sequence of data transmission by a fixed order system. When a trigger for transmitting data (or files) occurs, for example, the communicating device 100-1 starts data transmission.

The communicating device 100-1 sequentially compresses the data in fixed order (for example, in order of data D1, data D2, and data D3), and transmits the data.

The communicating device 100-1 starts compression of data D1 (S10). When the communicating device 100-1 then completes the compression of the data D1 (S11), the communicating device 100-1 starts transmission of the data D1 (S12), and starts compression of data D2, which is data to be transmitted next (S11).

When the communicating device 100-1 then completes the transmission of the data D1 before completion of the compression of the data D2 (S13), the communicating device 100-1 waits for completion of the compression of the data D2. When the communicating device 100-1 completes the compression of the data D2 (S14), the communicating device 100-1 starts transmission of the data D2 (S15), and starts compression of data D3, which is data to be transmitted next (S14).

When the communicating device 100-1 then completes the transmission of the data D2 before completion of the compression of the data D3 (S16), the communicating device 100-1 waits for completion of the compression of the data D3. When the communicating device 100-1 completes the compression of the data D3 (S17), the communicating device 100-1 starts transmission of the data D3 (S18). Then, the communicating device 100-1 completes the transmission of the data D3 (S19), and thereby completes data transmission.

A time T12 illustrated in FIG. 3 is a transmission completion time from the start of the compression of the data D1 by the communicating device 100-1 (S10) to completion of transmission of all of the data by the communicating device 100-1 (S19). The transmission completion time T12 includes a time T10 from the completion of the transmission of the data D1 to the completion of the compression of the data D2 and a time T11 from the completion of the transmission of the data D2 to the completion of the compression of the data D3. Both the time T10 and the time T11 are a time during which no data is transmitted from the communicating device 100-1, and are thus a time during which the communication line is not used efficiently.

Figure 4:
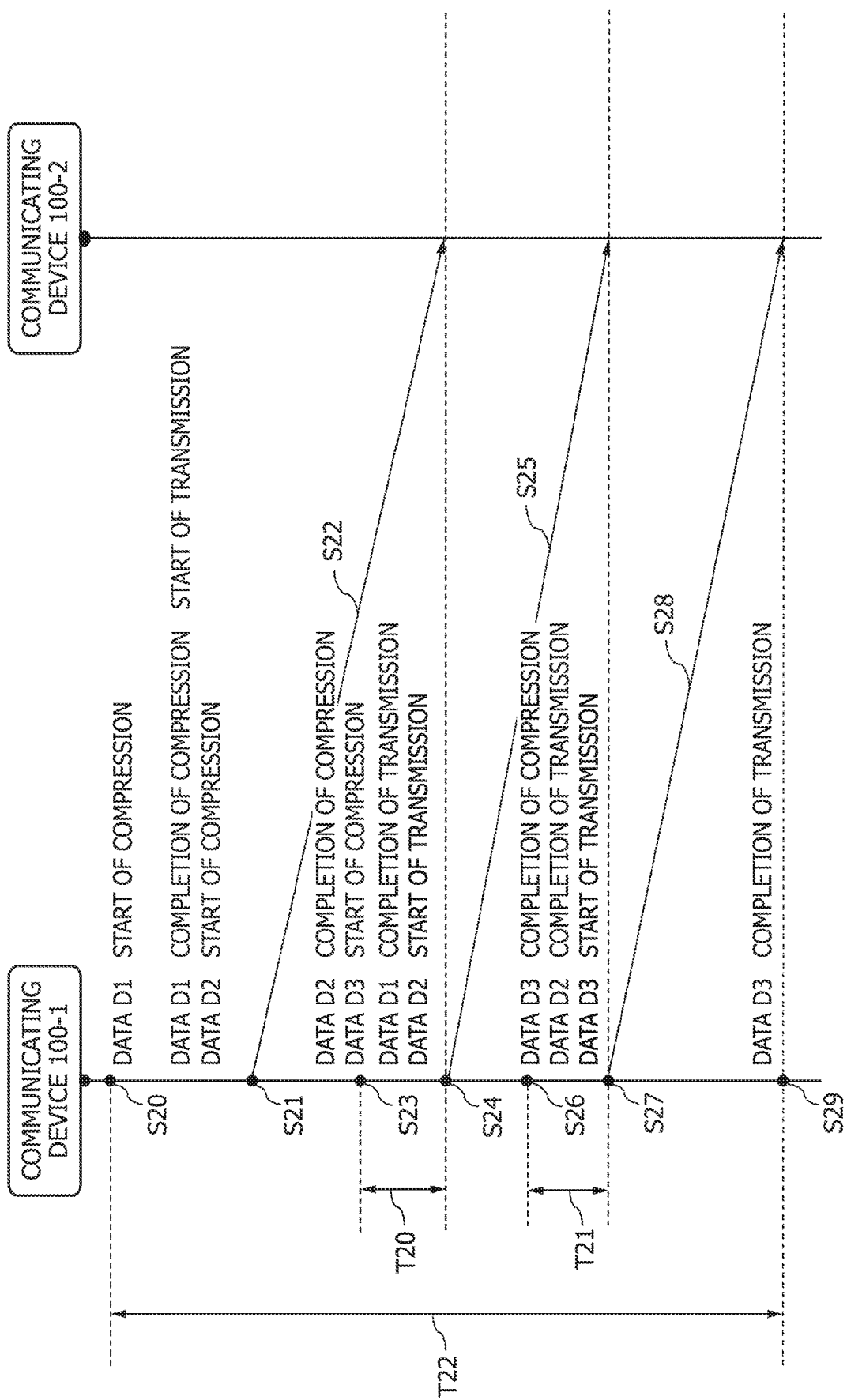
FIG. 4 is a diagram illustrating an example of a sequence of data transmission by a fixed order system.

FIG. 4 is a diagram illustrating an example of a sequence of data transmission by a fixed order system. Whereas transmission of data transmitted previously is completed before completion of compression in FIG. 3, compression is completed after completion of transmission of data transmitted previously in FIG. 4.

When a trigger for transmitting data (or files) occurs, for example, the communicating device 100-1 starts data transmission. The communicating device 100-1 compresses and transmits data in fixed order (for example, in order of data D1, data D2, and data D3).

The communicating device 100-1 starts compression of the data D1 (S20). When the communicating device 100-1 then completes the compression of the data D1 (S21), the communicating device 100-1 starts transmission of the data D1 (S22), and starts compression of the data D2, which is data to be transmitted next (S21).

When the communicating device 100-1 then completes the compression of the data D2 before completing the transmission of the data D1 (S23), the communicating device 100-1 starts compression of the next data D3 (S23), and waits for completion of the transmission of the data D1. When the communicating device 100-1 completes the transmission of the data D1 (S24), the communicating device 100-1 starts transmission of the data D2 (S25).

When the communicating device 100-1 then completes the compression of the data D3 before completing the transmission of the data D2 (S26), the communicating device 100-1 waits for completion of the transmission of the data D2. When the communicating device 100-1 completes the transmission of the data D2 (S27), the communicating device 100-1 starts transmission of the data D3 (S28). Then, the communicating device 100-1 completes the transmission of the data D3 (S29), and thereby completes data transmission.

A time T22 illustrated in FIG. 4 is a transmission completion time from the start of the compression of the data D1 by the communicating device 100-1 (S20) to completion of transmission of all of the data by the communicating device 100-1 (S29). The transmission completion time T22 includes a time T20 from the completion of the compression of the data D2 to the completion of the transmission of the data D1 and a time T21 from the completion of the compression of the data D3 to the completion of the transmission of the data D2. Both the time T20 and the time T21 are a time during which the communicating device 100-1 does not perform data compression processing and the processing power of the processor of the communicating device 100-1 is not used effectively. In addition, in compression processing, the longer a compression time, the smaller a size after the compression, for example. Therefore, the occurrence (or lengthening) of the time T20 and the time T21 in which compression processing is completed first means that there is a strong possibility that a time for waiting for completion of compression does not occur even when a compression system involving a longer compression time is used. For example, the communicating device 100-1 does not use an appropriate compression system. Therefore, the communicating device 100-1 causes a needless transmission wait time, and does not use the communication line efficiently.

<Data Transmission by Variable System>

Data transmission by the variable system will be described. The communicating device 100 assigns a plurality of transmission target files to transmission groups including a plurality of files, and determines transmission order within the transmission groups. Incidentally, in the first embodiment, description will be made of a case where the communicating device 100-1 supports only one compression system (first compression system).

Figure 5:
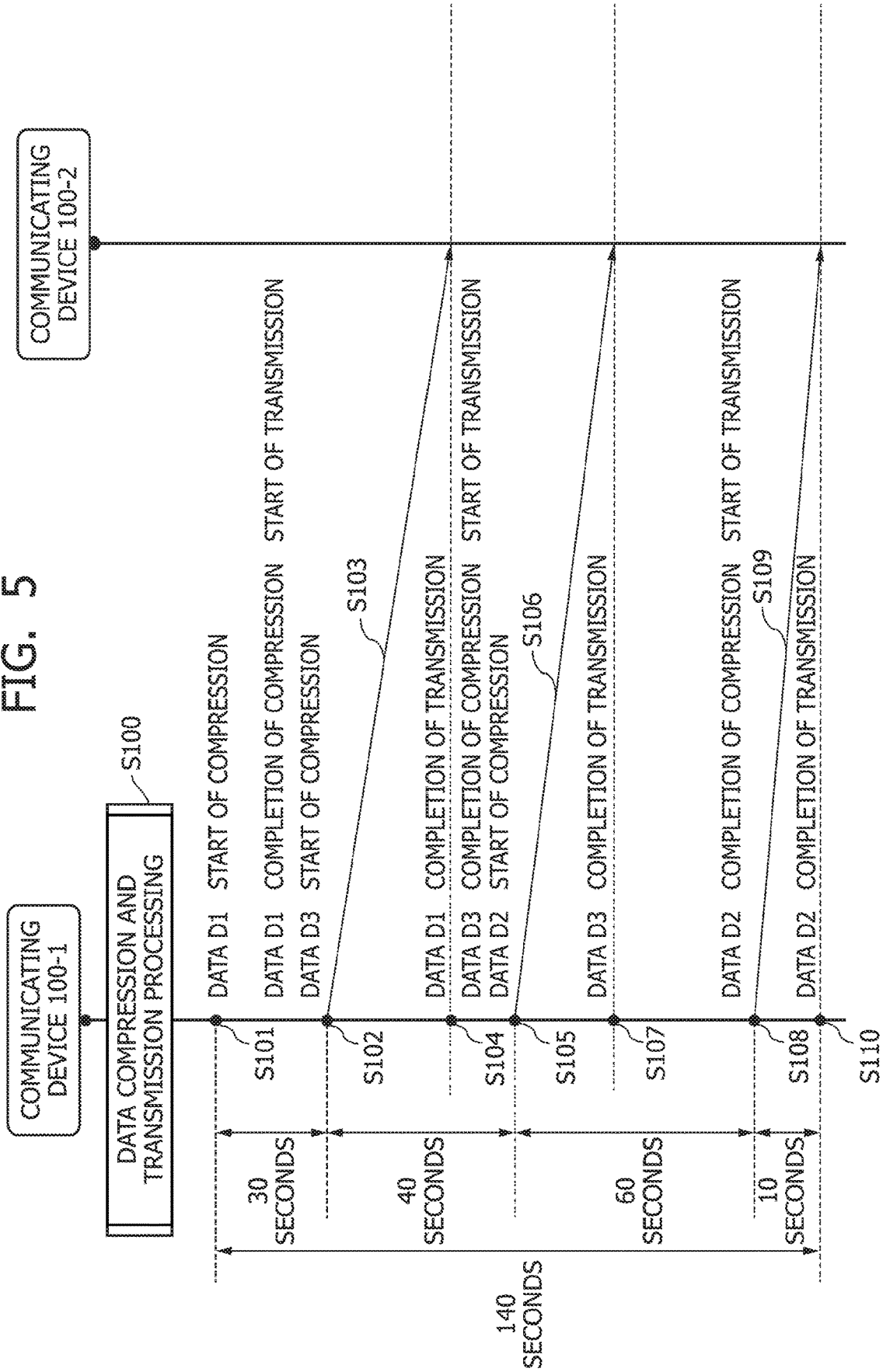
FIG. 5 is a diagram illustrating an example of a sequence of data transmission by a variable system.

FIG. 5 is a diagram illustrating an example of a sequence of data transmission by a variable system. When a trigger for transmitting data occurs, the communicating device 100-1 performs data compression and transmission processing (S100).

Figure 6:
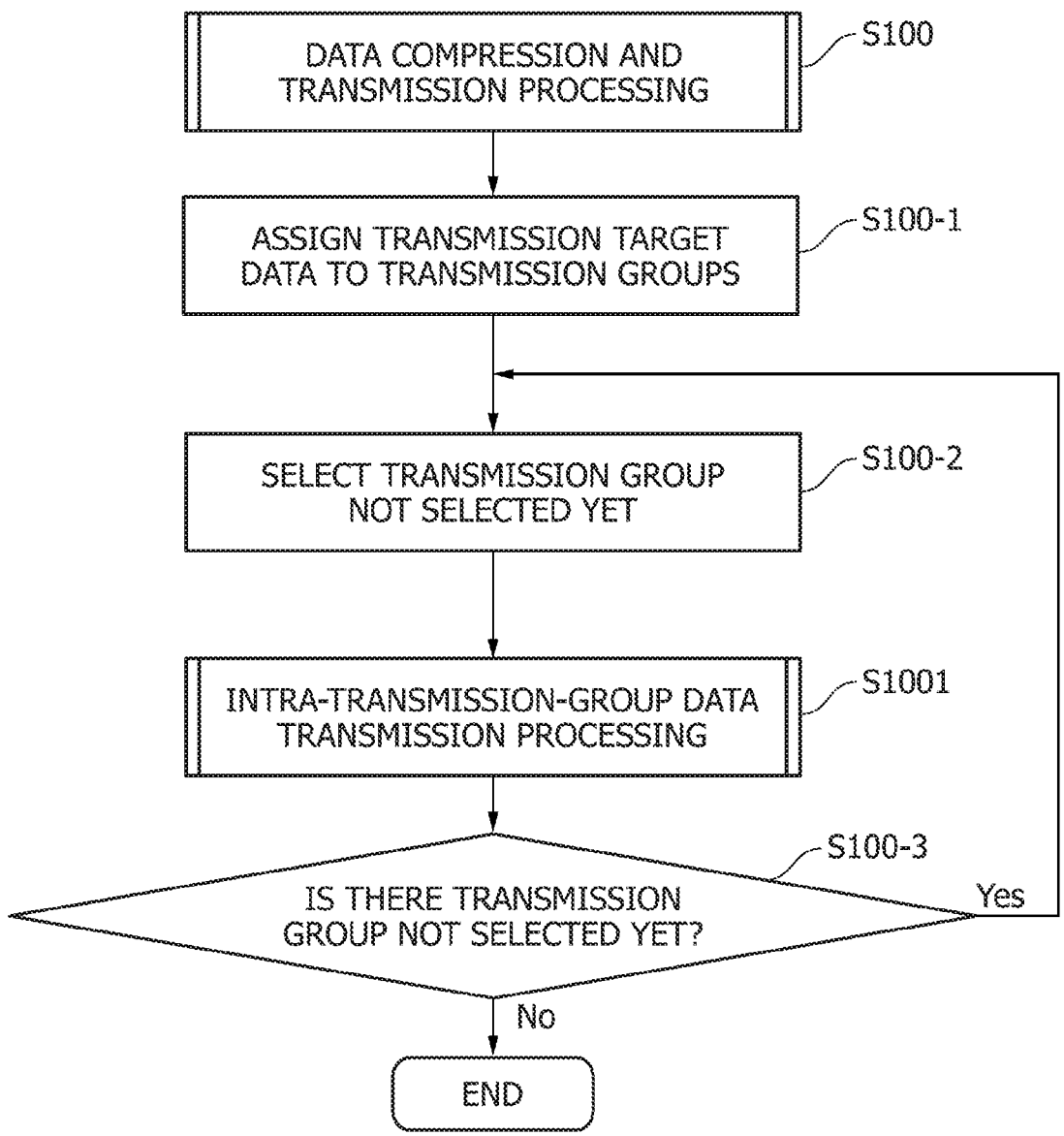
FIG. 6 is a diagram illustrating an example of a processing flowchart of data compression and transmission processing S100.

FIG. 6 is a diagram illustrating an example of a processing flowchart of data compression and transmission processing S100. The communicating device 100 assigns transmission target data to transmission groups (S100-1).

A transmission group is, for example, a group constituted of a plurality of files (data). The communicating device 100 determines the transmission order of the files in the transmission group. Incidentally, suppose that the transmission target data is, for example, backup data, that the order in which to transmit the transmission target data to the communicating device 100-2 as a storage destination of the backup data is not determined, and that the storage of the backup data is performed regardless of the transmission order in which the transmission target data is transmitted.

The communicating device 100, for example, assigns the transmission target data to the transmission groups according to the size of the transmission target data in the processing S100-1. The communicating device 100, for example, sorts the transmission target data in decreasing order of the size of the transmission target data, and assigns given numbers of pieces of transmission target data to the respective transmission groups in decreasing order of size. Consequently, the data sizes of the data belonging to the respective transmission groups are the same or within a given size range. The compression time of data and the size of the data after compression correspond to the size of the data before the compression. Therefore, when the data sizes within the transmission groups are made to be the same or approximate to each other, compression times and transmission times of the data belonging to the transmission groups are highly likely to be approximate to each other.

In addition, the communicating device 100 may make the number of pieces of data in a transmission group having a small data size larger than the number of pieces of data in a transmission group having a large data size. The communicating device 100 may thereby make total values of the data sizes of the data belonging to the transmission groups identical or approximate to each other. As described above, the compression time of data and the size of the data after compression correspond to the data size of the data before the compression. Thus, making the total values of the data sizes of the data belonging to the transmission groups identical or approximate to each other reduces difference between the transmission completion times of the respective transmission groups.

Further, the communicating device 100 may determine the number of pieces of data of one transmission group according to the processing power of the CPU. The communicating device 100 may set the number of pieces of data of one transmission group to a numerical value equal to or less than the number of pieces of data from which transmission completion times may be calculated for combinations in all transmission orders within a given time, for example.

The communicating device 100 selects a transmission group not selected yet (S100-2). Then, the communicating device 100 performs intra-transmission-group data transmission processing for the selected transmission group (S1001). The communicating device 100 checks whether or not there is a transmission group not selected yet (S100-3). When there is a transmission group not selected yet (Yes in S100-3), the communicating device 100 selects the transmission group not selected yet again (S100-2), and performs the intra-transmission-group data transmission processing S1001. The communicating device 100 thus repeats the processing S100-2, the intra-transmission-group data transmission processing S1001, and the processing S100-3 until there is no longer a transmission group not selected yet (for example, a transmission group not transmitted yet). Incidentally, the communicating device 100, for example, selects transmission groups in numerical order of the transmission groups in the processing S100-2.

Then, the communicating device 100 ends the processing when there is no transmission group not selected yet (No in S100-3).

Figure 7:
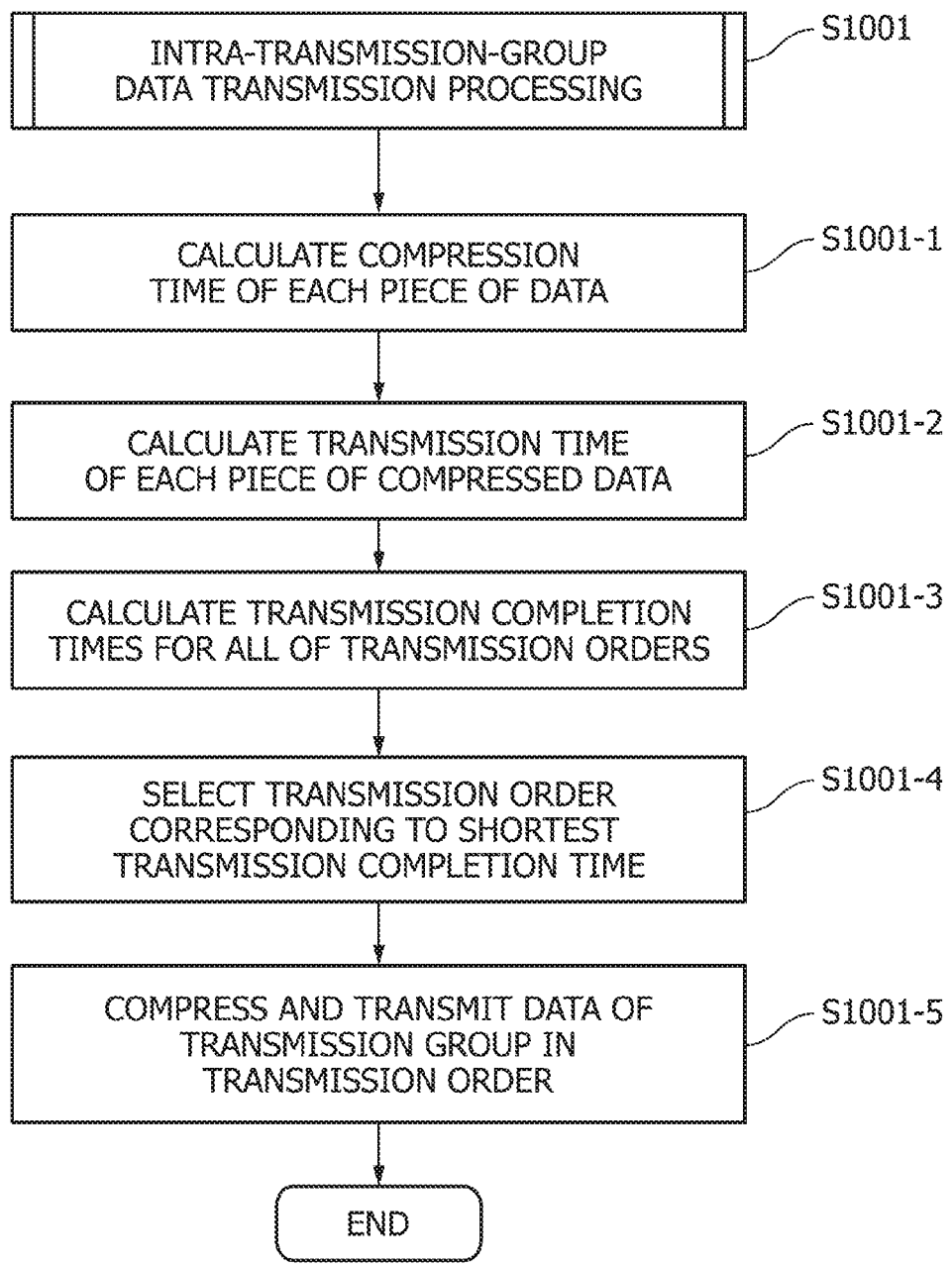
FIG. 7 is a diagram illustrating an example of a processing flowchart of intra-transmission-group data transmission processing S1001 in a first embodiment.

FIG. 7 is a diagram illustrating an example of a processing flowchart of intra-transmission-group data transmission processing S1001 in the first embodiment. The intra-transmission-group data transmission processing S1001 in the first embodiment is processing of determining the transmission order of data within a transmission group in a case of one compression system (for example, in a case where the compression system is not variable).

The communicating device 100 calculates a compression time of each piece of data within the transmission group (S1001-1). The communicating device 100, for example, calculates the compression time based on statistical data of compression times in past data and an original data size. Alternatively, the communicating device 100 may calculate the compression time based on a compression algorithm and the original data size.

The communicating device 100 calculates a transmission time of each piece of compressed data (S1001-2). The communicating device 100 calculates the transmission time based on statistical data of transmission times in past data and a data size after compression (or original data). Alternatively, the communicating device 100 may calculate the transmission time based on a present communication speed and the data size after compression (predicted size).

The communicating device 100 calculates transmission completion times for all of transmission orders in the transmission group (S1001-3). The communicating device 100 then selects a transmission order corresponding to a shortest transmission completion time (S1001-4).

The communicating device 100 compresses the data within the transmission group in the selected transmission order, and transmits the data whose compression is completed (S1001-5).

FIG. 8 is a diagram illustrating an example of compression times and transmission times of data D1 to D3 in a first compression system. "Data" in FIG. 8 indicates a data name. In addition, "compression time (seconds)" in FIG. 8 indicates the compression time of each piece of data in seconds. In addition, "transmission time (seconds)" in FIG. 8 indicates the transmission time of the data after compression in seconds. The communicating device 100, for example, accumulates actual result values of compression times and transmission times of past data, and calculates the compression times and the transmission times based on the accumulated actual result values.

FIG. 9 is a diagram illustrating an example of transmission completion times of respective transmission orders in a first compression system. According to FIG. 9, as an example, the transmission order of a pattern 1 is order of data D1, data D2, and data D3. In addition, according to FIG. 9, the transmission completion time of the pattern 1 is 150 seconds, which results from adding together a compression time of 30 seconds of the data D1, a compression time of 60 seconds of the data D2, a compression time of 40 seconds of the data D3, and a transmission time of 20 seconds of the data D3. In the pattern 1, because of the long compression time of each piece of data, the transmission of previous data being transmitted is completed during the compression of data. Therefore, in the pattern 1, the transmission completion time is a time obtained by adding a sum of the compression times of the data D1, the data D2, and the data D3 to the transmission time of the data D3 transmitted last. In the following, suppose that in the sequence of FIG. 5, the communicating device 100-1 performs the data compression and transmission processing S100 based on FIG. 8 and FIG. 9.

Returning to the sequence of FIG. 5, in the data compression and transmission processing S100, the communicating device 100-1 calculates transmission completion times of patterns 1 to 6 (S1001-3 in FIG. 7), and selects a pattern whose transmission time is shortest (S1001-4 in FIG. 7). The communicating device 100-1 selects the pattern 2 (which may be the pattern 5) whose transmission completion time is 140 seconds as illustrated in FIG. 9.

The communicating device 100-1 performs compression and transmission in order of the data D1, the data D3, and the data D2, the order being the transmission order of the pattern 2. The communicating device 100-1 starts compression of the data D1 (S101). When the communicating device 100-1 completes the compression of the data D1 30 seconds later (S102), the communicating device 100-1 starts transmission of the data D1 (S103). The communicating device 100-1 then starts compression of the data D3, which is second data in the transmission order (S102).

When the communicating device 100-1 completes the transmission of the data D1 30 seconds later (S104), the communicating device 100-1 does not complete the compression of the data D3. The communicating device 100-1 therefore waits for completion of the compression of the data D3. When the communicating device 100-1 then completes the compression of the data D3 40 seconds after the start of the compression of the data D3 (10 seconds after the completion of the transmission of the data D1) (S105), the communicating device 100-1 starts transmission of the data D3 (S106). The communicating device 100-1 then starts compression of the data D2, which is third data in the transmission order (S105).

When the communicating device 100-1 completes the transmission of the data D3 20 seconds later (S107), the communicating device 100-1 does not complete the compression of the data D2. The communicating device 100-1 therefore waits for completion of the compression of the data D2. When the communicating device 100-1 then completes the compression of the data D2 60 seconds after the start of the compression of the data D2 (40 seconds after the completion of the transmission of the data D3) (S108), the communicating device 100-1 starts transmission of the data D2 (S109).

Then, 10 seconds later, the communicating device 100-1 completes the transmission of the data D2, which is the last data in the transmission order within the transmission group (S110), and thereby completes data transmission within the transmission group.

A transmission completion time from the start of the compression of the data D1 (S101) to the completion of the transmission of the data D2 (S110) in the communicating device 100-1 is 140 seconds (=30 seconds+40 seconds+60 seconds+10 seconds).

In the first embodiment, the communicating device 100 calculates transmission completion times based on the compression times of the respective pieces of data in the prescribed compression system and the transmission times of the data after compression, and selects a transmission order corresponding to a shortest transmission completion time. Thus, the communicating device 100 may use the communication line efficiently.

In addition, in the first embodiment, the communicating device 100 determines a transmission group in which transmission order is changed. When the number of pieces of transmission target data is increased, the combinations of transmission orders are increased exponentially, and therefore an amount of processing and a processing time in the communicating device 100 are increased. The communicating device 100 may suppress an increase in the amount of processing and the processing time by, for example, setting the number of pieces of data within a transmission group to a number corresponding to the processing power.

Second Embodiment

A second embodiment will next be described. In the second embodiment, the communicating device 100-1 further supports a second compression system in addition to the first compression system. The communicating device 100-1 determines transmission order including a compression system.

<Data Transmission by Variable System>

Figure 10:
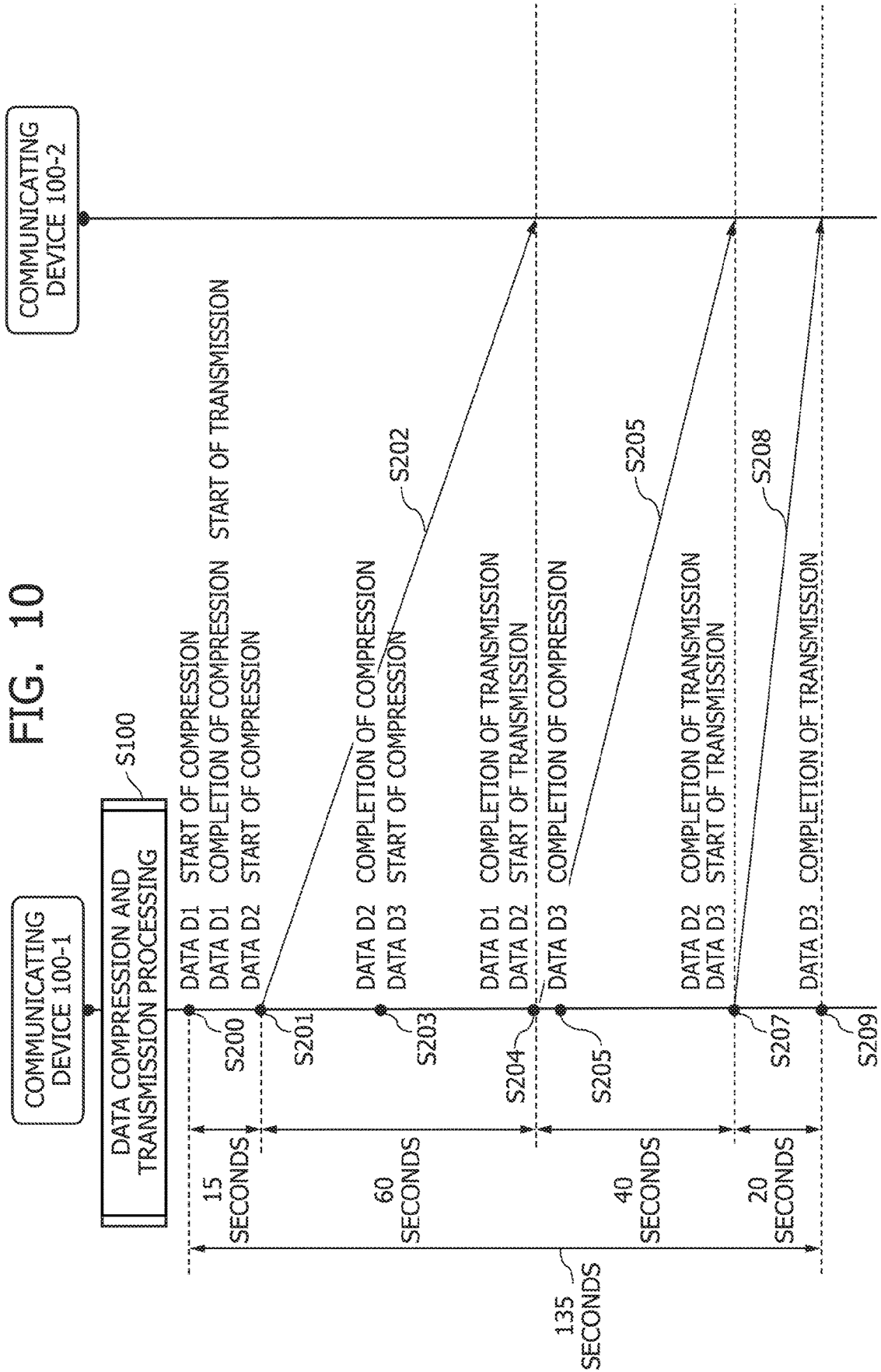
FIG. 10 is a diagram illustrating an example of a sequence of data transmission by a variable system.

FIG. 10 is a diagram illustrating an example of a sequence of data transmission by a variable system. When a trigger for transmitting data occurs, the communicating device 100-1 performs data compression and transmission processing (S100).

In the data compression and transmission processing S100, the communicating device 100-1 assigns transmission target data to transmission groups (S100-1 in FIG. 6). Then, the communicating device 100-1 selects a transmission group (S100-2 in FIG. 6), and performs intra-transmission-group data transmission processing (S1001).

Figure 11:
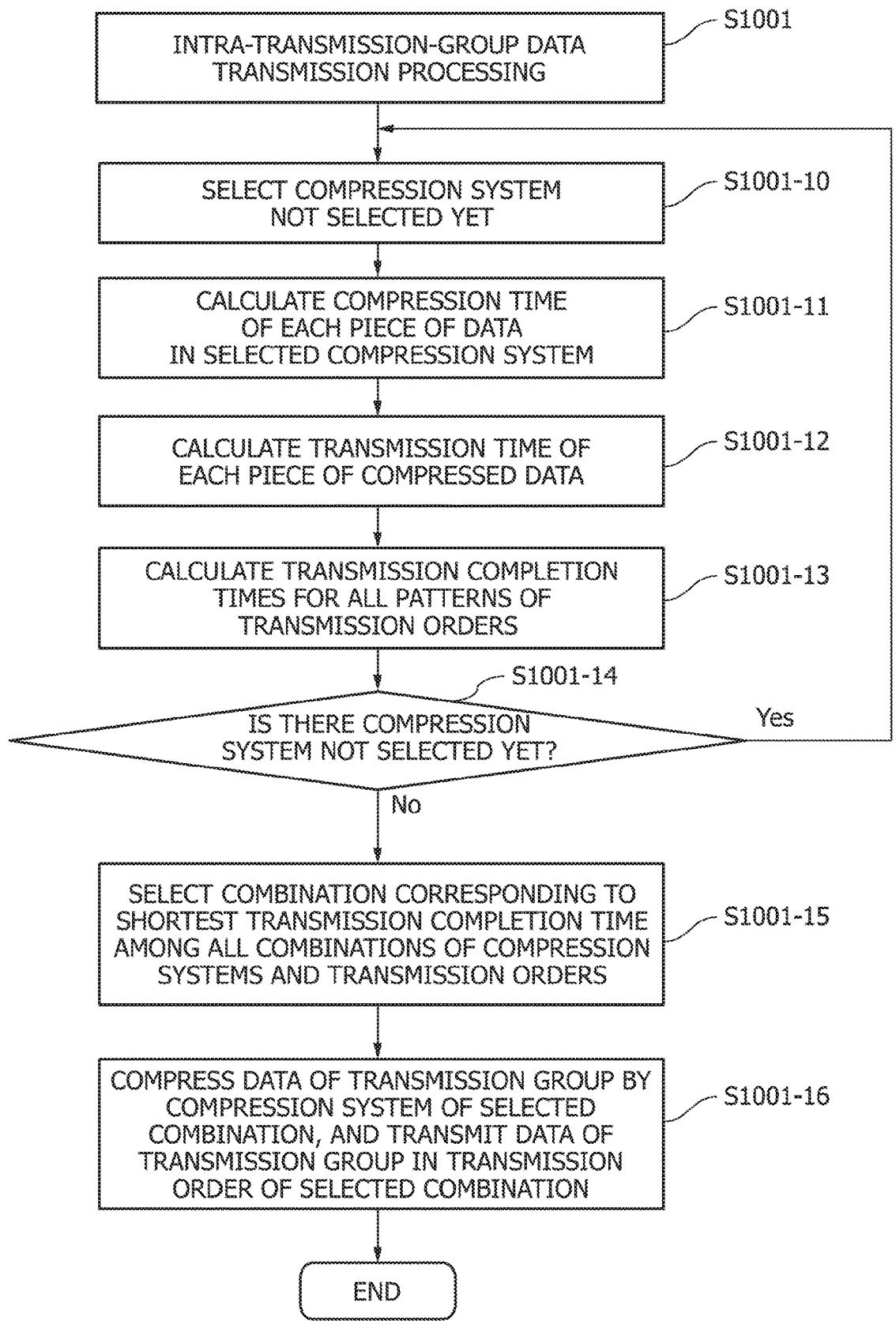
FIG. 11 is a diagram illustrating an example of a processing flowchart of intra-transmission-group data transmission processing S1001 in a second embodiment.

FIG. 11 is a diagram illustrating an example of a processing flowchart of intra-transmission-group data transmission processing S1001 in the second embodiment. The intra-transmission-group data transmission processing S1001 in the second embodiment is processing of determining the transmission order and compression system of data within a transmission group in a case where there are a plurality of compression systems.

The communicating device 100 selects a compression system not selected yet (S1001-10). The communicating device 100 then calculates a compression time of each piece of data in the selected compression system within the transmission group (S1001-11). The communicating device 100 further calculates a transmission time of each piece of compressed data (S1001-12).

The communicating device 100 calculates transmission completion times for all of transmission orders based on the calculated compression time and the calculated transmission time (S1001-13).

When there is a compression system not selected yet (Yes in S1001-14), the communicating device 100 selects the compression system not selected yet (S1001-10), and performs the processing S1001-11 to 13.

When there is no compression system not selected yet (No in S1001-14), on the other hand, the communicating device 100 selects a combination corresponding to a shortest transmission completion time among all combinations of the compression systems and the transmission orders (S1001-15). Then, the communicating device 100 compresses the data of the transmission group by the selected compression system, transmits the data of the transmission group in the selected transmission order (S1001-16), and ends the processing.

FIG. 12 is a diagram illustrating an example of compression times and transmission times of data D1 to D3 in a second compression system. Incidentally, suppose that an example of the compression times and the transmission times of the data D1 to D3 in the first compression system is similar to that of FIG. 8 illustrated in the first embodiment.

FIG. 13 is a diagram illustrating an example of transmission completion times of respective transmission orders in a second compression system. According to FIG. 13, as an example, the transmission order of a pattern 1 is order of the data D1, the data D2, and the data D3. In addition, according to FIG. 13, the transmission completion time of the pattern 1 is 135 seconds, which results from adding together a compression time of 15 seconds of the data D1, a transmission time of 60 seconds of the data D1, a transmission time of 20 seconds of the data D2, and a transmission time of 40 seconds of the data D3. In the pattern 1, because of the short compression time of each piece of data, the compression of data is completed before completion of the transmission of previous data being transmitted. Therefore, in the pattern 1, the transmission completion time is a time obtained by adding the compression time of the data D1 compressed first to a sum of the transmission times of the data D1, the data D2, and the data D3. Incidentally, suppose that an example of the transmission completion times of the respective transmission orders in the second compression system is similar to that of FIG. 9 illustrated in the first embodiment. In the following, suppose that in the sequence of FIG. 10, the communicating device 100-1 performs the data compression and transmission processing S100 based on FIG. 12 and FIG. 13.

Returning to the sequence of FIG. 10, the communicating device 100-1 calculates transmission completion times of patterns 1 to 6 in the first and second compression systems in the data compression and transmission processing S100 (S1001-13 in FIG. 11). The communicating device 100 then selects the pattern 1 (which may be the pattern 2) in the second compression system, the pattern 1 in the second compression system corresponding to a shortest transmission completion time (S1001-15 in FIG. 11).

The communicating device 100-1 uses the second compression system, and performs compression and transmission in order of the data D1, the data D2, and the data D3, the order being the transmission order of the pattern 1. The communicating device 100-1 starts compression of the data D1 (S200). When the communicating device 100-1 completes the compression of the data D1 15 seconds later (S201), the communicating device 100-1 starts transmission of the data D1 (S202). The communicating device 100-1 then starts compression of the data D2, which is second data in the transmission order (S201).

When the communicating device 100-1 completes the compression of the data D2 30 seconds later (S203), the communicating device 100-1 does not complete the transmission of the data D1. The communicating device 100-1 therefore waits for completion of the transmission of the data D1. In addition, the communicating device 100-1 starts compression of the data D3, which is third data to be transmitted (S203).

When the communicating device 100-1 completes the transmission of the data D1 60 seconds after the start of the transmission of the data D1 (30 seconds after the completion of the compression of the data D2) (S204), the communicating device 100-1 starts transmission of the data D2 (S205). Then, the compression of the data D3 is completed substantially at the same time as the start of the transmission of the data D2 (S204) (S206).

When the communicating device 100-1 completes the transmission of the data D2 40 seconds later (S207), the communicating device 100-1 starts transmission of the data D3 (S208).

Then, 20 seconds later, the communicating device 100-1 completes the transmission of the data D3, which is the last data in the transmission order within the transmission group (S209), and thereby completes data transmission within the transmission group.

A transmission completion time from the start of the compression of the data D1 (S200) to the completion of the transmission of the data D3 (S209) in the communicating device 100-1 is 135 seconds (=15 seconds+60 seconds+40 seconds+20 seconds).

In the second embodiment, the communicating device 100 determines a compression system and transmission order of data within a transmission group. The communicating device 100 may thereby determine the compression system and the transmission order corresponding to a short transmission completion time, so that usage efficiency of the communication line is improved.

Third Embodiment

A third embodiment will next be described. In the third embodiment, when the communicating device 100-1 determines a compression system and transmission order, the communicating device 100-1 selects compression systems in order according to order of priority, and decides on a selected compression system when a shortest transmission completion time in the selected compression system is within a given range (time threshold value).

<Data Transmission by Variable System>

Suppose that compression times and transmission times in the first compression system in the third embodiment are similar to those of FIG. 8. In addition, suppose that the transmission completion times of respective transmission orders in the first compression system in the third embodiment are similar to those of FIG. 9. Further, an example of a sequence of data transmission by a variable system in the third embodiment is similar to that of FIG. 5. Thus, description will be made in the following using the sequence of FIG. 5.

When a trigger for transmitting data occurs, the communicating device 100-1 performs data compression and transmission processing (S100). In the data compression and transmission processing S100, the communicating device 100-1 assigns transmission target data to transmission groups (S100-1 in FIG. 6). Then, the communicating device 100-1 selects a transmission group (S100-2 in FIG. 6), and performs intra-transmission-group data transmission processing (S1001).

Figure 14:
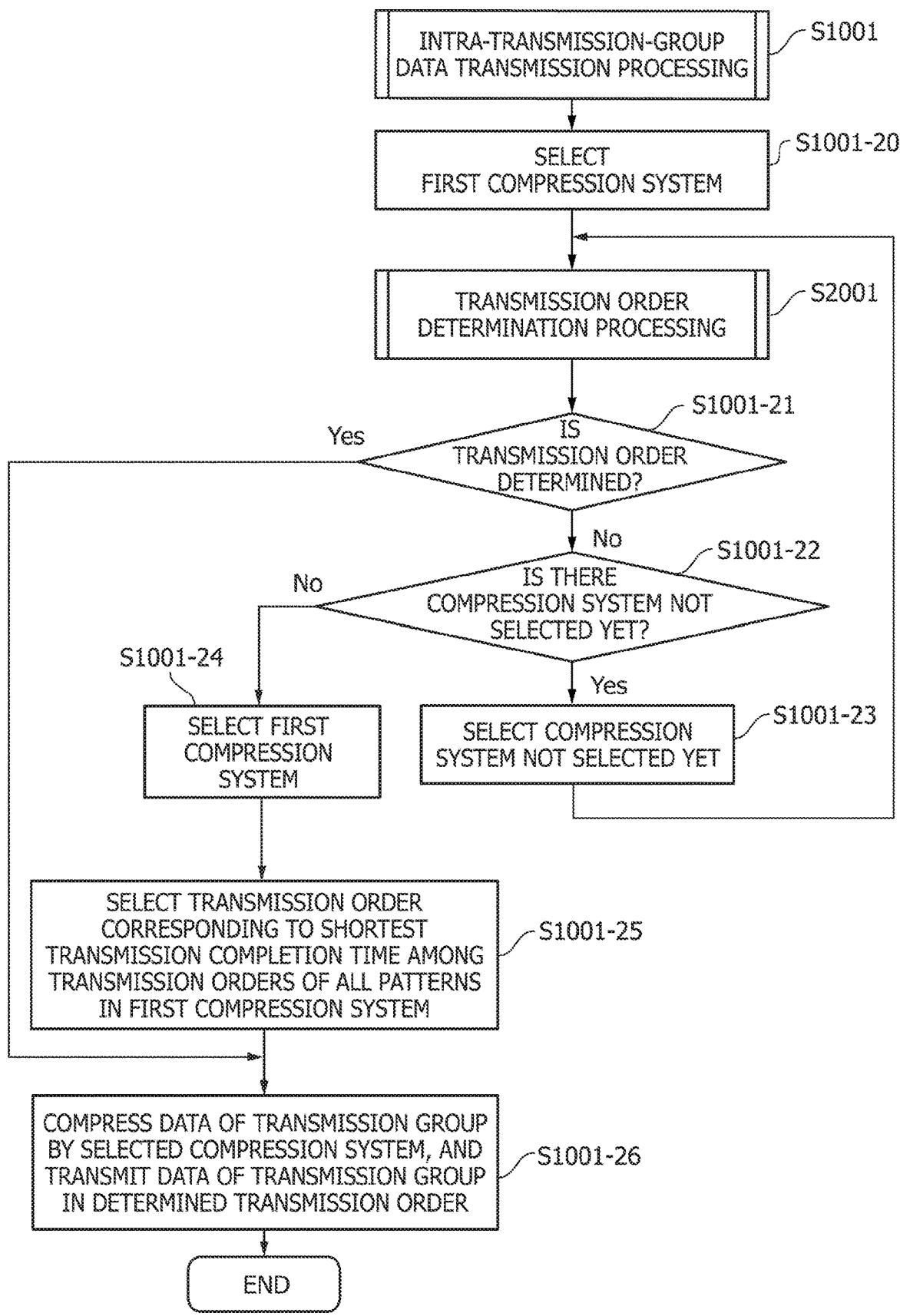
FIG. 14 is a diagram illustrating an example of a processing flowchart of intra-transmission-group data transmission processing S1001 in a third embodiment.

FIG. 14 is a diagram illustrating an example of a processing flowchart of intra-transmission-group data transmission processing S1001 in the third embodiment. The intra-transmission-group data transmission processing S1001 in the third embodiment is processing of determining transmission order and a compression system of data within a transmission group in a case where there are a plurality of compression systems. Further, the intra-transmission-group data transmission processing S1001 in the third embodiment is processing that has an order of priority for the compression systems, and determines a compression system according to the order of priority when a transmission completion time is within a given range.

The communicating device 100 selects the first compression system (S1001-20). The first compression system is a compression system given a highest priority. The communicating device 100 then performs transmission order determination processing (S2001). The transmission order determination processing S2001 is processing that determines a transmission order when a shortest transmission completion time of all of transmission orders in the selected compression system is within a given range, and does not determine the transmission order when the shortest transmission completion time of all of the transmission orders in the selected compression system is not within the given range. A detailed processing flowchart of the transmission order determination processing S2001 will be described later.

When the transmission order is determined (Yes in S1001-21), the communicating device 100 compresses the data of the transmission group by the selected compression system, transmits the data of the transmission group in the determined transmission order (S1001-26), and ends the processing.

When the transmission order is not determined (No in S1001-21), on the other hand, the communicating device 100 checks whether or not there is a compression system not selected yet (S1001-22). When there is a compression system not selected yet, the communicating device 100 selects a next compression system in the order of priority, and performs the transmission order determination processing S2001. The communicating device 100 repeats the transmission order determination processing S2001 until the transmission order is determined (Yes in S1001-21) or until there is no longer a compression system not selected yet (No in S1001-22).

When the transmission order is not determined (No in S1001-21) and there is no compression system not selected yet (No in S1001-22), the communicating device 100 selects the first compression system (S1001-24). The communicating device 100 selects the first compression system given the highest priority when the transmission order is not determined in any of the compression systems.

The communicating device 100 then determines the transmission order corresponding to a shortest transmission completion time among the transmission orders of all patterns in the first compression system as the transmission order of the data (S1001-25). Then, the communicating device 100 compresses the data of the transmission group by the selected compression system, transmits the data of the transmission group in the determined transmission order (S1001-26), and ends the processing.

Figure 15:
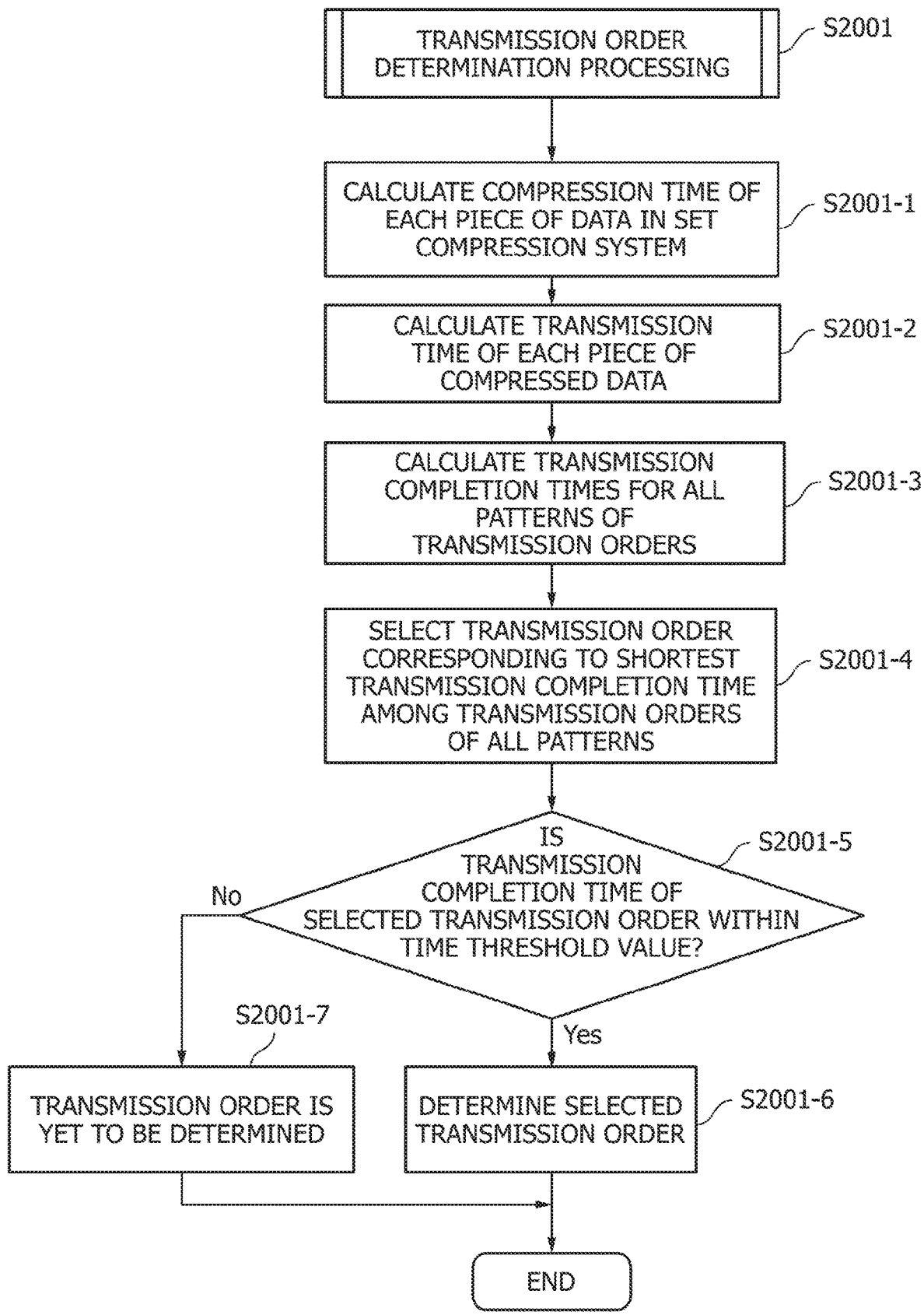
FIG. 15 is a diagram illustrating an example of a processing flowchart of transmission order determination processing S2001.

FIG. 15 is a diagram illustrating an example of a processing flowchart of transmission order determination processing S2001. The communicating device 100 calculates a compression time of each piece of data in the transmission group in the selected compression system (S2001-1). The communicating device 100 calculates a transmission time of each piece of compressed data (S2001-2). The communicating device 100 then calculates transmission completion times for all the patterns of the transmission orders (S2001-3).

The communicating device 100 selects the transmission order corresponding to a shortest transmission completion time among the transmission orders of all the patterns (S2001-4). The communicating device 100 then checks whether or not the transmission completion time of the selected transmission order is within the given range (S2001-5).

The given range is, for example, a set time set in advance. The communicating device 100, for example, stores the set time in an internal memory or a storage according to an operation of an administrator or a user of the communicating device 100. The communicating device 100 determines that the transmission completion time of the selected transmission order is within the given range when the transmission completion time is equal to or less than the set time. Incidentally, the set time may, for example, be fixed, or may be a time corresponding to a data size (total size of the data of the transmission group).

In addition, the given range may, for example, be a time based on a sum of the transmission times of the data of the transmission group. The communicating device 100 may, for example, set, as the given range, a numerical value obtained by multiplying the sum of the transmission times of the data of the transmission group by a given multiplying factor. By setting the numerical value obtained by multiplying the sum of the transmission times by the given multiplying factor (for example, a factor of 1.1) as the given range, the communicating device 100 may perform transmission in the selected compression system when a time during which data is not transmitted (a time during which only compression is performed) does not exceed a given proportion (for example, 10%) of the sum of the transmission times.

In addition, the given range may, for example, be a time based on a sum of the compression times of the data of the transmission group. The communicating device 100 may, for example, set, as the given range, a numerical value obtained by multiplying the sum of the compression times of the data of the transmission group by a given multiplying factor. By setting the numerical value obtained by multiplying the sum of the compression times by the given multiplying factor (for example, a factor of 1.1) as the given range, the communicating device 100 may perform transmission in the selected compression system when a time during which data is not compressed (a time during which only data transmission is performed) does not exceed a given proportion (for example, 10%) of the sum of the compression times.

In addition, the given range may, for example, be a time based on the sum of the compression times of the data of the transmission group and the sum of the transmission times of the data of the transmission group. The communicating device 100 may, for example, set, as the given range, a numerical value obtained by multiplying the larger of the sum of the compression times and the sum of the transmission times by a given multiplying factor.

Further, the given range may, for example, be a numerical value obtained by multiplying a longest transmission completion time of the patterns of all the transmission orders of the transmission group by a given multiplying factor. By setting the numerical value obtained by multiplying the longest transmission completion time by the given multiplying factor (for example, 0.9) as the given range, the communicating device 100 may select a transmission order corresponding to a transmission completion time reduced from the longest transmission completion time by a given proportion (10%). The communicating device 100 may determine the given range so as to produce a time reducing effect equal to or more than the given proportion by changing the transmission order.

When the transmission completion time of the selected transmission order is within the given range (Yes in S2001-5), the communicating device 100 decides on the selected transmission order (S2001-6), and ends the processing. When the transmission completion time of the selected transmission order is not within the given range (No in S2001-5), on the other hand, the communicating device 100 decides that the transmission order is not determined yet (S2001-7), and ends the processing.

Returning to the sequence of FIG. 5, in the data compression and transmission processing S100, the communicating device 100-1 selects the first compression system (S1001-20 in FIG. 14), and performs the transmission order determination processing S2001. Then, in the transmission order determination processing S2001, the communicating device 100 selects the pattern 2 whose transmission completion time is shortest (140 seconds) in the first compression system from FIG. 9 (S2001-4 in FIG. 15).

The communicating device 100 then checks whether or not the transmission completion time (140 seconds) of the selected pattern 2 is within the given range. The communicating device 100, for example, sets, as the given range, a numerical value (144 seconds) obtained by multiplying the longest transmission completion time (160 seconds) of all of the transmission order patterns of the transmission group by a given multiplying factor (0.9). The communicating device 100 determines that the transmission completion time (140 seconds) of the selected pattern 2 is within the given range (144 seconds) (Yes in S2001-5 in FIG. 15), and determines that the selected pattern 2 is the transmission order (S2001-6 in FIG. 15).

Subsequent processing S101 to S110 is similar to that of the first embodiment.

In the third embodiment, the communicating device 100 selects compression systems according to order of priority, and compresses data by a selected compression system when a transmission completion time in the selected compression system is within a given range. Thus, in a case where there is a recommended (prioritized) compression system, for example, the communicating device 100 may use the recommended compression system except when the transmission completion time in the recommended compression system is longer than the given range.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a data transmitting program configured to cause a computer to perform a process comprising:
   classifying transmission target files into transmission groups;
   calculating, for each of the transmission files, a first compression time taken to compress the file by a first compression system and a first transmission time taken to transmit the file after being compressed by the first compression system; and
   determining, for each of the transmission groups, a compression order and a transmission order of files belonging to the transmission group based on the first compression time and the first transmission time in which a transmission completion time from a start of compression of a file to be compressed first to completion of transmission of a file transmitted last is shortest, as the compression order and the transmission order of the files belonging to the transmission group,
   wherein a transmission of the compressed file is performed in parallel with a compression of another transmission file.

2. The storage medium according to claim 1, wherein in the determining further comprises:
   when the transmission completion time from a start of compression of a file to be transmitted first to completion of transmission of a file transmitted last in the transmission order in which the transmission completion time is shortest is within a time threshold value, determining that the transmission order is the transmission order of the files belonging to the transmission group.

3. The storage medium according to claim 2, wherein the process further comprising:
   calculating, when the transmission completion time is more than the time threshold value, for each of the transmission files, a second compression time taken to compress the file by a second compression system, different from the first compression system, and a second transmission time taken to transmit the file after being compressed by the second compression system; and
   determining, when the transmission completion time in the transmission order in which the transmission completion time is shortest in the second compression system is within the time threshold value, that a compression system is the second compression system, and that the transmission order is the transmission order of the files belonging to the transmission group.

4. The storage medium according to claim 3, wherein in the determining further comprises:
   when the transmission completion time in the transmission order in which the transmission completion time is shortest in all of selectable compression systems is more than the time threshold value, determining that the compression system is the first compression system, and determining that the transmission order in which the transmission completion time is shortest in the first compression system is the transmission order of the files belonging to the transmission group.

5. The storage medium according to claim 1, wherein the process further comprising:
   calculating a second compression time taken to compress the file by a second compression system other than the first compression system and a second transmission time taken to transmit the file after being compressed by the second compression system; and
   determining the transmission order of the files belonging to the transmission group based on the first compression time, the first transmission time, the second compression time, and the second transmission time.

6. The storage medium according to claim 5, wherein in the determining further comprises:
   a compression system and the transmission order in which the transmission completion time from the start of compression of the file to be compressed first to completion of transmission of the file transmitted last is shortest are determined as the compression system and the transmission order of the files belonging to the transmission group.

7. The storage medium according to claim 1, wherein in the classifying, the transmission target files are classified into the transmission groups according to data sizes of the respective transmission target files.

8. The storage medium according to claim 7, wherein in the classifying further comprises:
   the transmission target files having data sizes within a given size range into are classified into a same transmission group.

9. The storage medium according to claim 7, wherein in the classifying further comprises:
   the transmission target files are classified into the transmission groups such that sums of data sizes of files belonging to transmission groups, respectively, are identical or approximate to each other.

10. The storage medium according to claim 1, wherein the transmission target files include data for backup.

11. A data transmitting device comprising: a memory, and
    a processor coupled to the memory and configured to perform a process comprising:
    classifying transmission target files into transmission groups;
    calculating, for each of the transmission files, a first compression time taken to compress the file by a first compression system and a first transmission time taken to transmit the file after being compressed by the first compression system; and determining, for each of the transmission groups, a compression order and a transmission order of files belonging to the transmission group based on the first compression time and the first transmission time in which a transmission completion time from a start of compression of a file to be compressed first to completion of transmission of a file transmitted last is shortest, as the compression order and the transmission order of the files belonging to the transmission group, wherein a transmission of the compressed file is performed in parallel with a compression of another transmission file.

12. A data transmission method performed by a computer comprising:

classifying transmission target files into transmission groups;

calculating, for each of the transmission files, a first compression time taken to compress the file by a first compression system and a first transmission time taken to transmit the file after being compressed by the first compression system; and determining, for each of the transmission groups, a compression order and a transmission order of files belonging to the transmission group based on the first compression time and the first transmission time in which a transmission completion time from a start of compression of a file to be compressed first to completion of transmission of a file transmitted last is shortest, as the compression order and the transmission order of the files belonging to the transmission group, wherein a transmission of the compressed file is performed in parallel with a compression of another transmission file.

\* \* \* \* \*